(12) United States Patent
Wilkes et al.

(10) Patent No.: US 9,535,750 B1
(45) Date of Patent: Jan. 3, 2017

(54) RESOURCE TOLERATIONS AND TAINTS

(71) Applicant: GOOGLE INC., Mountain View, CA (US)

(72) Inventors: John Wilkes, Mountain View, CA (US); Brian Grant, Mountain View, CA (US)

(73) Assignee: Google Inc., Mountain View, CA (US)

( * ) Notice: Subject to any disclaimer, the term of this patent is extended or adjusted under 35 U.S.C. 154(b) by 267 days.

(21) Appl. No.: 14/142,545

(22) Filed: Dec. 27, 2013

(51) Int. Cl.
*G06F 9/50* (2006.01)
*G06F 9/46* (2006.01)

(52) U.S. Cl.
CPC .................................. *G06F 9/5005* (2013.01)

(58) Field of Classification Search
None
See application file for complete search history.

(56) References Cited

U.S. PATENT DOCUMENTS

| | | | |
|---|---|---|---|
| 8,046,765 B2 | 10/2011 | Cherkasova et al. | |
| 8,782,654 B2 | 7/2014 | Jackson | |
| 9,081,617 B1 | 7/2015 | Pendharkar et al. | |
| 2012/0137375 A1* | 5/2012 | Ramachandran | H04L 63/105 726/28 |
| 2013/0024937 A1* | 1/2013 | Glew | G06F 21/577 726/23 |

OTHER PUBLICATIONS

Patent application filed on Dec. 27, 2013, for U.S. Appl. No. 14/142,563.
Office Action dated Jan. 15, 2016 for U.S. Appl. No. 14/142,563.

* cited by examiner

*Primary Examiner* — Eric C Wai
(74) *Attorney, Agent, or Firm* — Lerner, David, Littenberg, Krumholz & Mentlik, LLP

(57) ABSTRACT

In a computing resource environment including at least one resource capable of being allocated to at least one of a plurality of tasks, techniques are disclosed for applying a taint to a resource in a computing resource environment, the taint being configured to prevent the resource from being claimed for a resource request without a toleration to that taint. Variations include receiving, at a resource scheduler in the resource environment, a request to allocate the resource to perform a particular task and determining whether the resource is subject to a taint. If the resource is subject to a taint, analyzing the request to determine if it includes a toleration for the taint. If the request includes a toleration for the taint, allocating the resource to the task. If the request does not include a toleration for the taint, not allocating the resource due to the taint.

27 Claims, 9 Drawing Sheets

RESOURCE TOLERATIONS AND TAINTS

BACKGROUND

Today increasingly, a complex large-scale computing environment is composed of multiple systems. These systems are independently developed and interact with each other, as well as interact with the user(s). Each of these systems in the environment manages a great number of resources. Some resources, however, may be limited in their availability either due to the constraints of tasks or processes utilizing them or due to problems with reliability of hardware or software portions thereof.

A challenge in such environments is effective scheduling, management and allocation of resources in the face of usage and/or reliability concerns as well as system maintenance and upgrade or update activities.

SUMMARY

In some embodiments of solutions discussed herein, a complex large-scale computing environment is composed of multiple systems. Such an environment may therefore be thought of, in some cases, as a system-of-systems. Such an environment may have one or more resource schedulers that manage system resources and allow various tasks to utilize or access those resources.

Existing systems allow constraints to be specified that are of the form "task X needs resource Y", or "task X needs resources with property Z". That makes it easy to steer requests to resources, but it doesn't make it easy for requests to be prevented from using a particular resource.

Within the context of this document, the term "resource" means any physical or logical component or data item or data collection that can be specifically identified for purposes of access, processing, tracking, or other uses within a system. A "resource" may, for example, include running processes, physical storage locations, virtual machines, processors, databases, database entries, and other system objects and/or components.

In view of the foregoing, it is desired to provide or define a systematic way of:

[a] Excluding a resource from being assigned to a request without modifying the request;

[b] Providing detailed or specific properties or filters on the exclusion; and

[c] Allowing or enabling some requests to override the exclusion.

The foregoing objectives can be realized, in some embodiments, by allowing certain system resources to be selectively or systematically tainted. A taint can be applied to a resource, or multiple resources. When a taint is applied to a resource, it can indicate that a request may not use this resource (e.g., be scheduled onto it). In some embodiments, such an exclusion may be overridden if the request tolerates the particular taint applied.

In some embodiments, taints can be applied manually or automatically, e.g., by a scheduler, according to a set of goals, rules, or patterns.

In some embodiments, a toleration is a specification of a taint or set of taints that a request can ignore. In some embodiments, a toleration may be specified by listing particular taints, or providing a pattern that one or more particular taints match, or some other means of specifying the set. In some embodiments, tolerations can be applied manually or automatically, e.g., by a scheduler, according to a set of goals, rules, or patterns.

In some embodiments, a taint may have additional information, such as a value. The value can be used, in some embodiments, to limit the scope of the toleration, by adding a comparison operator and a second value to a toleration. In some embodiments, a taint could have multiple values. In some embodiments, a toleration could specify multiple value-comparisons. In some embodiments, a taint could have a pattern that matched labels (and/or values) on requests. In such embodiments, a taint would only exclude requests that matched such a pattern. In some embodiments, a taint can have a start time and a duration (or an end time) such that outside this period the taint may not be active. In some embodiments, a taint may have a start time and duration (or end time) or recurrence period or combination thereof. In some such embodiments, the taint may normally be "on" or "off", but then either activated or suppressed for one or more periods.

In some embodiments, a taint can exclude the continued or further use of a resource by a request (an "exclusion taint"). In such embodiments, a tainted resource may not even be offered as available in response to a resource request. In some embodiments, a taint can prevent a request from initiating use of that resource (a "start taint"). Embodiments of such start taints may disallow any new claims or other resource requests or offers with start times that overlap the taint. In such embodiments, a tainted resource may be available to a resource request but cannot otherwise be claimed for use by that request.

Embodiments of techniques and solutions and systems described herein may be applicable in a computing resource environment including at least one resource capable of being allocated to at least one of a plurality of tasks. Embodiments may pertain to a method comprising: receiving, at a resource scheduler operably connected to the computing resource environment, a request to allocate the resource to perform a particular task; determining, in response to the received request, whether the resource is subject to a taint; in response to a determination that the resource is subject to a taint, analyzing the resource request to determine whether the resource request includes a toleration for the taint; in response to a determination that the resource request includes a toleration for the taint, allocating, with the resource scheduler, the resource to the particular task; and in response to a determination that the resource request does not include a toleration for the taint, not allocating the resource to the request due to the taint.

In some embodiments, the taint includes a first name, the toleration includes a second name; analyzing includes comparing the second name and the first name; and determining that the resource request includes a toleration for the taint based on an outcome of comparing.

In some embodiments, the taint includes a taint value, the toleration includes a toleration value and a toleration operator; analyzing includes comparing the toleration value and the taint value using the toleration operator; and determining that the resource request includes a toleration for the taint based on an outcome of comparing.

In some embodiments, the taint is included in a resource offer; the toleration includes a toleration match expression; and analyzing includes comparing the taint and the toleration match expression; and determining that the resource request includes a toleration for the taint based on an outcome of comparing.

In some embodiments, the taint includes a taint effect type and the toleration includes a tolerated effect type; analyzing includes first comparing the taint effect type and the tolerated effect type; and determining that the resource request includes a toleration for the taint based on an outcome of the first comparing.

In some embodiments, the resource represents a hardware component, the taint value represents a level of performance degradation in the hardware component, and the toleration value represents a maximum level of tolerated performance degradation such that the resource request includes a toleration for the taint in response to a determination that the level of performance degradation in the hardware component indicated by the taint value is less than the maximum level of tolerated performance degradation indicated by the toleration value.

In some embodiments, the resource offer represents an offer of one or more hardware resources, the taint includes a taint value represents a level of performance degradation in the hardware component, and the toleration match expression includes a toleration value represents a maximum level of tolerated performance degradation such that: the resource request includes a toleration for the taint in response to a determination that the level of performance degradation in the hardware component indicated by the taint value is less than or equal to the maximum level of tolerated performance degradation indicated by the toleration value.

In some embodiments, the taint includes a taint value, the toleration match expression includes a toleration value and a toleration operator; and comparing the taint and the toleration match expression includes comparing the toleration value and the taint value using the toleration operator.

In some embodiments, the toleration operator includes one or more of the logical operators: equals, regexp, greater than, less than, and not.

In some embodiments, the toleration operator includes one or more of the logical operators: equals, regexp, greater than, less than, and not.

In some embodiments, the taint effect type includes one of a start effect type and an exclusion effect type.

In some embodiments, the taint includes a taint name and the toleration includes a tolerated taint name; and the analyzing includes comparing the tolerated taint name and the taint name; and determining that the resource request includes a toleration for the taint when the taint name and the tolerated taint name match.

In some embodiments, the toleration match expression is represented by a tuple of a match expression name, a match expression operator, and a match expression value; and the comparing the taint and the toleration match expression includes matching a taint name to the match expression name; and comparing a taint value to the match expression value using the match expression operator.

In some embodiments, the request to allocate the resource includes at least one constraint; and the identifying the at least one resource includes determining whether the at least one resource includes one or more attributes that satisfy the at least one constraint.

In some embodiments, a taint is a resource attribute having an effect type that does not include a "label" effect.

In some embodiments, the request to allocate is a request for a particular resource type.

In some embodiments, the particular resource type includes at least one of: a memory resource type, a database resource type, a process thread resource type, a processor resource type, a virtual machine resource type, a TCP/IP port resource type, a physical machine resource type, and an application resource type.

In some embodiments, the step of allocating the resource includes indicating the resource as being claimed by the requesting entity for performance of the particular task in response.

In some embodiments, the taint includes a time-spec and the request to allocate includes a time-spec; and determining whether the resource is subject to the taint includes: comparing the taint time-spec and the request time-spec; and determining that the resource is subject to the taint in response to a determination that a time period specified by the taint time-spec overlaps with a time period specified by the request time-spec.

In some embodiments, the taint includes a time-spec indicating a start time and an indefinite duration. In some embodiments, the offer includes a time-spec indicating an effective lifetime of the offer. In some embodiments, the taint includes a time-spec indicating an effective lifetime of the taint, the taint time-spec being different from the offer time-spec. In some embodiments, the request to allocate includes a match expression that specifies a minimum required offer lifetime.

In some embodiments, the taint includes an effect type, the effect type being one of a start effect type and an exclusion effect type; the taint includes a time-spec and the request to allocate includes a time-spec; and determining whether the resource is subject to the taint includes: comparing the taint time-spec and the request time-spec; for a taint having an exclusion effect type, determining that the resource is subject to the taint in response to a determination that a time period specified by the taint time-spec overlaps with a time period specified by the request time-spec; and for a taint having a start effect type, determining that the resource is subject to the taint in response to a determination that a time period specified by the request time-spec includes a request start time that is after a taint start time specified by the taint time-spec; and the time period specified by the taint time-spec overlaps with a time period specified by the request time-spec.

Embodiments may pertain to non-transitory computer-readable medium having embodied thereon a data structure representing a request for use of a resource in a computing resource environment, the data structure includes a resource type indicating a type of resource being requested within the computing resource environment; a request time-spec indicating a duration for which the requested resource is to be used; a taint toleration indicating a toleration for a taint that could otherwise prevent the resource request from using a tainted resource, the taint toleration includes a taint name indicating the particular taint being tolerated.

In some embodiments, the toleration is represented by a match expression that includes: a toleration value; and a toleration operator; the toleration operator is configured for performing a comparison between the toleration value and a value associated with the taint.

In some embodiments, the structure further includes a constraint indicating a required attribute that a resource must have in order to fulfill the resource request, the constraint includes: an attribute name indicating the particular attribute required; and a constraint operator, the constraint operator is configured for performing a logical operation with respect to the required attribute.

In some embodiments, the constraint is represented by a constraint match expression that includes a constraint value and a constraint operator; the toleration is represented by a toleration match expression that includes a toleration value and a toleration operator; the toleration match expression is identified as pertaining to a toleration by being associated with a "tolerate" effect type; and the constraint match expression is identified as pertaining to a constraint by being associated with a "constrain" effect type.

Embodiments may pertain to a method of applying a taint to a resource in a computing resource environment, the taint being configured to prevent the resource from being claimed for a resource request without a toleration to that taint, the method comprising: applying the taint to the resource by associating, with a processor, information about the taint with an offer for use of the resource within the computing resource environment, the taint includes a taint name identifying the taint; and a taint effect type indicating an effect type of the taint; evaluating, with a processor, the resource request to determine whether the resource request requires a toleration to the taint; and in response to an evaluation that the resource request requires a toleration to the taint, allowing the resource request to claim the offered, tainted resource only if the resource request includes a toleration to the taint.

In some embodiments, the tainted resource includes at least one associated sub-resource, the sub-resource represents a discrete portion or constituent of the resource; and the method further comprising: propagating, with a processor, the applied taint to the sub-resource such that the sub-resource is tainted with the applied taint.

In some embodiments, the taint effect type includes one of an exclusion effect type and a start effect type; the evaluating includes: for a taint having an exclusion effect type, determining that the resource request requires a toleration to the taint in response to a determination that a time period representing an effective lifetime of the taint overlaps with a time period representing an effective lifetime of the request; and for a taint having a start effect type, determining that the resource request requires a toleration to the taint in response to a determination that the time period representing the effective lifetime of the request includes a request start time that is after a start time of the taint; and the time period representing the effective lifetime of the taint overlaps with the time period representing the effective lifetime of the request.

In some embodiments, the time period representing the effective lifetime of the taint is specified by a first time-spec; and the time period representing the effective lifetime of the request is specified by a second time-spec. In some embodiments, the effective lifetime of the taint being the same as an effective lifetime of the offer for use of the resource. In some embodiments, the first time-spec indicating a particular start time and an indefinite duration. In some embodiments, the second time-spec includes a match expression that specifies a minimum effective lifetime that an offer must have in order to be claimed by the request.

In some embodiments, the method further comprising: in response to a determination that the taint effect type is the exclusion effect, evaluating all resource requests associated with current or future claims made to the tainted resource; and suspending or evicting any of the evaluated resource requests that do not include a toleration to the taint and that have an effective lifetime that overlaps with the effective lifetime of the taint.

In some embodiments, the taint further includes a taint value; and the allowing the resource request to claim the offered, tainted resource only if the resource request includes a toleration to the taint includes: comparing the taint value against a toleration value included in a toleration associated with the resource request; and determining whether the resource request includes a toleration to the taint based on an outcome of the comparing.

In some embodiments, the tainted resource is a sub-resource of a higher-level resource, the sub-resource represents a discrete portion or constituent of the higher-level resource; and the method further comprising: pushing, with a processor, the applied taint up to the higher-level such that the higher-level resource is tainted with the applied taint.

In some embodiments, the resource is a physical machine and the sub-resource is a hardware component within the physical machine. In some embodiments, pushing includes adding, with a processor, information about the applied taint to the higher-level resource such that the higher-level resource includes a taint indicating that one of its discrete portions or constituents is tainted.

In some embodiments, the method further comprising: in response to the propagated taint having an exclusion effect type, evaluating all sub-resource requests associated with current or future claims made to the tainted sub-resource; and suspending or evicting any of the evaluated sub-resource requests that do not include a toleration to the taint and that have an effective lifetime that overlaps with an effective lifetime of the taint.

In some embodiments, the taint value includes a regular expression. In some embodiments, the resource includes a remote data store being utilized by a virtual machine. In some embodiments, the steps of applying and evaluating is performed with a resource scheduler operably connected to the computing resource environment. In some embodiments, the resource is a hard drive and the taint includes an indication of performance degradation in the hard drive.

In some embodiments, allowing the resource request to claim the offered, tainted resource only if the resource request includes a toleration to the taint includes: determining whether the resource request includes a toleration; in response to a determination that the resource request includes a toleration, determining whether the included toleration is a toleration for the applied taint; and in response to a determination that the included toleration is for the applied taint, allowing the resource request to claim the offered, tainted resource.

In some embodiments, determining whether the resource request includes a toleration includes determining whether the resource request is associated with a match expression representing a toleration. In some embodiments, the match expression represents a toleration is associated with a "tolerate" effect type.

In some embodiments, determining whether the included toleration is a toleration for the applied taint includes: comparing matching the taint to the match expression based on a value included in the match expression and a comparison operator included in the match expression; and determining whether the included toleration is a toleration for the applied taint based on an outcome of the comparing.

Embodiments may pertain to a non-transitory computer-readable medium having embodied thereon instructions which, when executed by at least one computer in a computing resource environment, causes the at least one computer to perform a method comprising one or more of the steps described above.

Embodiments may pertain to a system comprising: a processor; and a processor-readable medium having embodied thereon instructions which, when executed by the processor, cause the processor to perform method comprising one or more of the steps described above.

In some embodiments, the processor and processor-readable memory are included in a scheduler configured to manage resources in the computing resource environment. In some embodiments, the resource is included in a resource pool within the computing resource environment. In some embodiments the offer for use includes an offer for use of multiple resources from the resource pool. In some embodiments, the scheduler is configured to match resource offers and resource claims in the computing resource environment.

Embodiments may pertain to non-transitory computer-readable medium having embodied thereon a data structure representing a resource in a computing resource environment, the data structure includes: a resource identifier representing an identifier for the resource within the computing resource environment; a resource taint representing a taint that prevents the resource from being claimed by a resource request without a toleration to that taint, the resource taint includes a taint name representing an identifier for the taint; a taint effect type representing an effect type of the taint; and a time-spec specifying an effective lifetime of the taint.

In some embodiments, the structure further comprising a resource attribute representing an attribute of the resource within the computing resource environment, the resource attribute includes: an attribute name representing an identifier for the attribute; and an attribute value representing a value associated with the resource.

In some embodiments, the taint effect type includes one of a start effect type and an exclusion effect type, the start effect type making the taint applicable only to resource requests attempting to claim the tainted resource after the taint becomes effective; and the exclusion effect type making the taint applicable to all resource requests associated with the tainted resource while the taint is effective.

Embodiments of some or all of the processor and memory systems disclosed herein may also be configured to perform some or all of the method embodiments disclosed above. Embodiments of some or all of the methods disclosed above may also be represented as instructions embodied on transitory or non-transitory processor-readable storage media such as optical or magnetic memory or represented as a propagated signal provided to a processor or data processing device via a communication network such as an Internet or telephone connection.

Further scope of applicability of the systems and methods discussed will become apparent from the detailed description given hereinafter. However, it should be understood that the detailed description and specific examples, while indicating embodiments of the systems and methods, are given by way of illustration only, since various changes and modifications within the spirit and scope of the concepts disclosed herein will become apparent to those skilled in the art from this detailed description.

BRIEF DESCRIPTION OF THE DRAWINGS

The systems and methods discussed will become more fully understood from the detailed description given herein below and the accompanying drawings that are given by way of illustration only and thus are not limitative.

Figure 1A:
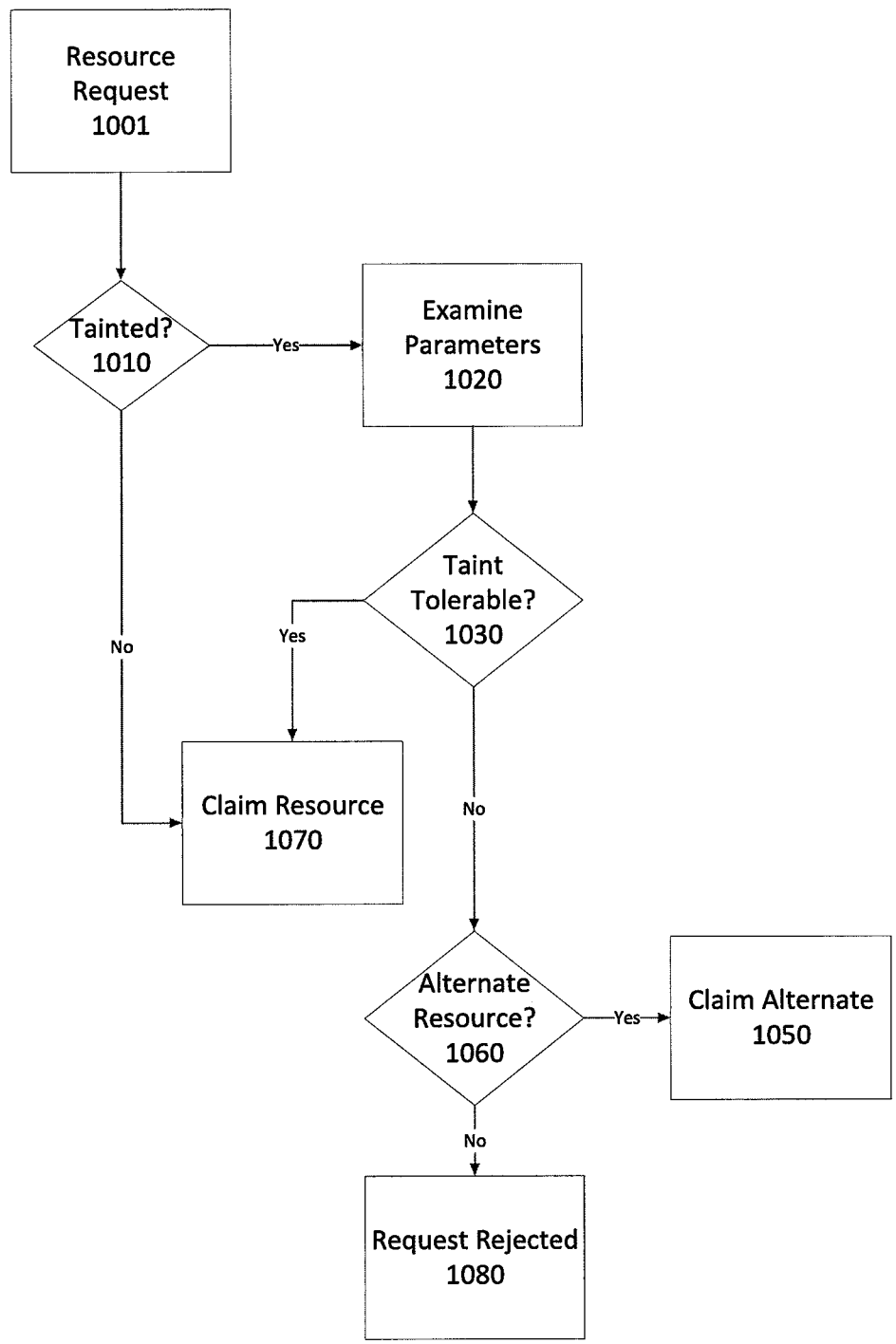
FIG. 1a shows a block diagram representing an embodiment of a workflow associated with a request for a tainted resource as described herein.

The drawings will be described in detail in the course of the detailed description.

DETAILED DESCRIPTION

The following detailed description refers to the accompanying drawings. The same reference numbers in different drawings identify the same or similar elements. Also, the following detailed description does not limit the concepts discussed. Instead, the scope of the concepts discussed herein is defined by the appended claims and equivalents thereof.

DEFINITIONS within the context of this document, the following terms will have meanings consistent with the definitions set forth below

[a] Resource: a physical or logical component of a computing system or computing environment or a data item or data collection stored in or accessed by a computing system or computing environment. A "resource" can be specifically identified for purposes of access, processing, tracking, control, or other uses within a system by means of a data structure, logical object, or other structured information representing the resource and/or its inherent or associated properties. Examples of resources include: running processes, applications, physical storage locations, virtual machines, processors, process threads, processor time, storage devices, disk drives, interface cards, machines, power, power supply components, network devices, memory, storage space, network bandwidth, storage access time, databases, database entries, and other system objects and/or components.

[b] Claim: a claim is a reservation of resource(s) by a task or a request for a specific period of time.

[c] Offer: an offer is an indication that a resource is available to fulfill a task or request. In some embodiments, an offered resource may be claimed by or for a task or request that is to be performed at some time after the resource is claimed.

[d] Attribute: an attribute is a label that can be applied to a resource or multiple resources. An attribute may include information indicating various parameters such as an attribute effect-type, an attribute key, a value, and, a start time and end time or other indicator of duration or periodicity. In some embodiments, an attribute may be a persistent, standalone object having a duration that is independent of the resource to which it is applied. In some embodiments, an attribute may not be a persistent, standalone object and may instead be represented as a data field or other portion of a data structure, logical object, or other structured information representing the resource and/or its inherent or associated properties. An attribute applied to or associated with a resource may be reflected in the data structure or logical object representative of that resource.

[e] Taint: A taint is a type of attribute. When a taint is applied to a resource, it can indicate that a resource request may not use this resource (e.g., be scheduled onto it) unless the resource request includes a toleration of the taint.

[f] Match Expression: A match expression specifies one or more attributes or taints ("targets") by means of one or more expressions. An expression may include a name, an operator, and a value. The name may be used to identify the targets to which the expression refers. The operator and value may be used to select the targets whose values accord with the value provided in the match expression, using the semantics of the operator (e.g., attribute-value less than expression-value). If the operator is omitted, the expression may only match targets that have the same name, and the value may be ignored.

[g] Constraint: A constraint is something that can be applied to a resource request to limit the placement of claims on resources by restricting the resources that can be taken from to those with specified attributes. A constraint may utilize one or more match expressions to identify resources that have attributes conforming to the match expression(s) of the constraint. Applying a constraint to a resource request will require that a resource have attributes that satisfy the constraint in order to be utilized by a claim or resource request with that constraint.

[h] Toleration: A toleration is something that can be applied to a resource request to indicate that the resource request may ignore or otherwise overlook a particular taint (or taints) on a resource. A toleration of a taint therefore allows a resource request to claim resources that it would otherwise not be able to. Whereas constraints require that a resource have the attributes identified therein, tolerations do not require that the resource have the tolerated taint. Tolerations can identify taints that they tolerate or override through, for example, a match expression.

In some embodiments, taints and attributes are calendared labels that can be added to a set of resources described by an offer. In some embodiments, taints, tolerations, attributes, and constraints may be resolved or otherwise evaluated prior to or as part of a resource allocation operation by a scheduler. In some embodiments, issues of taints, tolerations, attributes, and constraints may be evaluated prior to or as part of an attempt to claim an offered resource.

In some embodiments, taints or attributes bound to a resource may have a start time, an end time, an effect type, a text key, and may have a value. Taints and attributes may have the same structure or data fields, but their presence may cause different effects in a resource allocation scheme or scheduler. In some embodiments, constraints can limit the placement of claims on resources by restricting the resources that can be reserved to those with specified attributes. A taint prevents resources from being reserved or otherwise occupied by a claim unless that claim, or the task or request associated with that claim, tolerates the taint.

In some embodiments, taints can be attached or applied to different resources (e.g., all the resources of a machine, or just the CPU resources on that machine). In some embodiments, taints may not be removable by mechanisms like suspension. Suspension occurs when a particular task, request, claim, or attribute is temporarily or indefinitely prevented from making use of or being associated with that resource. Some taints may, depending on their effect type(s), cause tasks or claims to a resource to become suspended. Such suspension will be discussed in more detail later in this document. Some taints or taint values may persist for the lifetime of the underlying resource (e.g. processor type, memory size), or for the duration of some physical state (e.g., flaky memory, faulty network card, corrupted application); others are more transient, and may need to be calendared independently (e.g., taints related to OS abilities, or software configuration properties).

In some embodiments, taints may have different lifetimes than offers in order to facilitate addition or removal of a taint without having to change the offers. In some embodiments, such different lifetimes may allow taints to apply for different, partially-overlapping periods without having to change the underlying offers on every transition boundary.

In some embodiments, taints may be applied to various resources or aspects of a system for various reasons. Examples include: a flaky disk or memory bank may be restricted, and only those tasks that explicitly acknowledge this flakiness are allowed to use it; a machine may be in post-crash recovery, and no new activities are permitted to start there; a machine may be having its OS upgraded, so cannot be used by any other activities; a machine may be being drained as soon as possible, and only tasks that are explicitly permitted to start during this time may be placed there; jobs with too high a priority may be barred from running (or starting) on a machine (such as, for instance, time-consuming jobs that may suspend impending system maintenance tasks); a machine may be or become unreachable (such as, for example, due to failure of a network card or router or cable), and no new tasks should be started there, but current ones may continue to run; a machine may be tainted or otherwise marked in a way that prohibits other user's jobs from running there (e.g., the presence of a particular task on a machine may prohibit other kinds of tasks from running there).

An embodiment of a resource request and request claim workflow in an environment with tainted resources is depicted in FIG. 1a. In the embodiment shown, a resource request 1001 may be sent to or generated by a scheduler as part of a job or a task within a job. The resource request 1001 may include a request for a particular resource or for a particular type of resource or for multiple resources or resource types. The scheduler may evaluate the resource request 1001 to determine whether a resource or resource type that is available to fulfill the resource request is tainted 1010. If the resource is not tainted 1010, the resource request may claim the resource 1070 and the associated job or task may utilize it. If the resource is tainted 1010, the parameters associated with the taint (or taints) on the resource may be examined 1020 and compared against any tolerations included in the resource request to determine whether the taint (or taints) on the resource is tolerated 1030 by the resource request.

In some embodiments, responsive to a determination that the taint is tolerated 1030 by the resource request, the resource request may be allowed to claim the resource 1070 for the task or job associated with the request. In some embodiments, responsive to a determination that one or more taints associated with the resource are not tolerated by the resource request, a scheduler or other resource allocation utility may attempt to identify an alternate or substitute resource 1060 that is suitable to fulfill the resource request. In some embodiments, for example, a resource request may be for access to a processor for a certain time window, use of any available network card to send or receive data, or use of any available memory. In addressing a request for any available memory, for example, that resource request may be fulfilled with any available memory resource that is not tainted. In such embodiments, an alternative resource may be claimed 1050 in the event the initially selected resource is incompatibly tainted with respect to the resource request.

In some embodiments, an alternative resource may not be available if the specific resource identified in the resource request is tainted with respect to the resource request. In some embodiments, an alternative resource may not be available because no other available resource matches the constraint(s) in the resource request 1001. In some such embodiments, a resource request may be unable to claim any resources and may therefore be rejected 1080 while the requested resource(s) is subject to the taint. For example, a resource request may be for a particular resource, such as a specific virtual or physical machine or a machine located within a particular cluster. In such embodiments, the resource request may be unable to claim the specific resource, leaving the resource request unfulfilled.

Although depicted in a particular sequence, embodiments of the operations and process shown in FIG. 1*a* may be carried out in different orders. In some embodiments, at least some of the depicted operations may be performed simultaneously or concurrently. In some embodiments, for example, determination of whether a resource is tainted may occur independently of an evaluation of request parameters, with the two being reconciled or compared during a claim attempt.

In some embodiments, taints may be a way to identify or otherwise restrict access to resources on "soft dedicated" machines, which are machines where only certain kinds of new jobs may be able to run (e.g., just short-lived batch jobs). For example, in some embodiments, a taint may indicate a presence of a task handling personally identifying information (PII) or data or operations related to Sarbanes-Oxley (SOX) compliance on a machine, which may in turn may prohibit other kinds of tasks from running there until the machine has been wiped clean. In some embodiments, machines or resources may enter a state from which they may need to be wiped clean, or returned to a known state from a particular or unusual configuration. In some embodiments, machines or resources may need to be configured or set to a particular or unusual configuration. Tainting the machine or resources thereon may be a way to prevent other uses while this is done, and (in some cases) while the new configuration is in effect.

In some embodiments, known or planned unavailable periods may be calendared using taints. In some embodiments, such taints may be rescindable or otherwise configured with a time period during which they are active. Such embodiments may allow for resource availability restrictions to be effected and rescinded with as little residual impact as possible (e.g., if a future planned outage for maintenance is cancelled, removing the taint associated therewith avoids a need to reschedule everything that might have been excluded by it).

In some embodiments, applying taints to machines or resources allows for the imposition of new behaviors without retrofitting existing configuration files. In some embodiments, applied taints and the attendant resource scheduling, request, and claim processes may be resilient to changes in resource sizes (e.g., a solid-state disk (SSD) that shrinks over time, or a machine that gets repaired or updated, and has more resources than before).

In some embodiments, some claims or resource requests must sometimes be able to constrain their placement to resources having taints that are acceptable to or tolerated by the resource request associated with the claim. A scheduler or other resource allocation utility handling tainted resources should, in some embodiments: permit individual claims to be placed on resources with a taint, or with a taint that has a certain value or range of values; support numeric comparisons (e.g., ">343", "<120") and release-version comparisons (e.g., "later than 2.26.4"); have multiple tolerations apply simultaneously; refer to system-supplied or user-supplied taints; or any combination thereof.

In some embodiments, a taint is a resource attribute with an associated behavior that excludes compatibility unless it is overridden. If a resource is tainted, then no claim may be bound to or reserve that resource unless it tolerates the taint. (I.e., any claim that draws on those resources will be infeasible for the duration of the taint, and thus be suspended.)

Figure 2A:
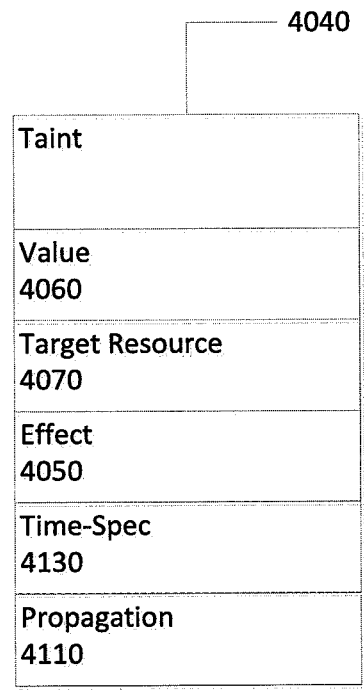
FIG. 2a shows a block diagram representing an embodiment of a data structure associated with a taint as described herein.

FIG. 2*a* shows an embodiment of a logical representation of a taint. In some embodiments, a taint 4040 may include one or more particular values 4060, such as a value indicating a level of resource degradation associated with a tainted resource or a value indicating a name of a user or user group that is permitted to use or excluded from using a particular resource. A taint 4040 may also include or otherwise refer to some identifying information that specifies a target resource 4070 to which the taint is applied. In some embodiments, a taint 4040 may be created by specifying a target resource 4070 to which the taint 4040 will be applied. In some embodiments, a taint 4040 may exist independently of the resource 4070 to which the taint 4040 will be applied. In such embodiments, the taint 4040 may be created independently of the resource 4070 and applied to the resource at some later time.

In some embodiments, a resource attribute is an annotation on the resources described by an offer or associated with a machine or a device. In some embodiments, a device may refer to any physical or logical resource, such as a processor or a memory chip or a disk drive or a network card. In some embodiments, attributes may include information indicating an attribute effect-type, an attribute key, a value, and a start time and end time or other indicator of duration or periodicity.

In some embodiments, a taint 4040 may have its temporal and/or periodic properties defined through a time-spec, which communicates when the taint applies. An embodiment of a time-spec may include a definition of one or more time-periods. Such definition may be realized by combinations, groupings, or pairings of time-related values. Embodiments may include zero or more of a start time, end time, duration, and a recurrence specification. In some embodiments, the start time of a time-spec may be implied by the time at which taint is applied.

In some embodiments, a time-spec may be an independent or standalone data structure that may be defined separately from and/or independently of any other information or data structure. In some embodiments, a time-spec may be represented by a group of fields or information embedded in other data structures, parameters, or property lists. In some embodiments, a time-spec may be included in other data structures, parameters, or property lists by reference.

In embodiments where a start time is provided or implied in a time-spec, the time spec—may refer to a time that is at or after that start time. In some embodiments, the time-spec may refer to any time, or any time after the taint 4040 is created, unless overruled by another parameter. In embodiments where an end time or duration is provided, the time spec may be understood as specifying a time period determined by the provided combination of start time, end time, and/or duration.

In the embodiment shown in FIG. 2a, the taint 4040 includes a time-spec 4130 that may specify temporal aspects of a taint. In some embodiments, for instance, a taint may be intended to remain on a resource for a predetermined or limited time period. A taint 4040 restricting access to a resource only to a dedicated group, for example, may be meant to expire after a certain period of hours, minutes or days.

In some embodiments, a taint may include an empty or null time-spec. In some embodiments, a taint may not include any kind of time-spec. In some such embodiments, the taint may be meant to be permanent to the resource until such time as the resource is modified, repaired, or replaced. For example, a taint indicating that a flash memory is reaching the end of its usable lifetime may be meant to remain on that resource until the resource is removed from the computing environment.

In the embodiment shown, the taint 4040 includes an effect 4050 parameter that specifies the effect of the taint 4040. In some embodiments, the effect 4050 may specify one of several predetermined or configurable effect types.

In some embodiments, a taint effect parameter 4050 may indicate a start effect type. Taints having a start effect type 4050 may disallow any new claims or other resource requests with start times that occur during the time the taint is active. In some embodiments, claims or resource requests that have already started before the taint is placed or activated may be allowed to continue even if the claim or request does not otherwise have an appropriate toleration to the taint.

In some embodiments, a taint effect parameter 4050 may indicate an exclusion effect type. Taints having an exclusion effect type 4050 may suspend any claims against the tainted resource during the time the taint is active unless they have the appropriate tolerance. Unlike a start taint, all claims or resource requests for a resource with an exclusion taint, including ones that have already started before the taint is placed or activated, may be required to tolerate the taint in order to remain active.

Figure 2B:
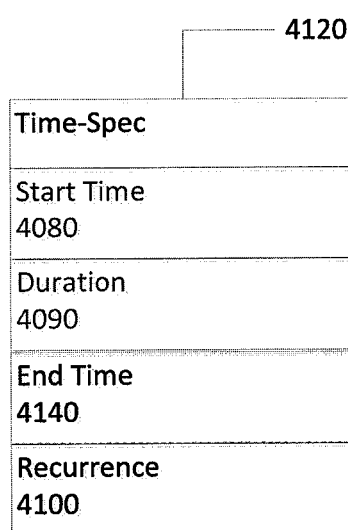
FIG. 2b shows a block diagram representing an embodiment of a data structure associated with a time spec as described herein.

An embodiment of a time-spec is depicted in FIG. 2b. In the embodiment shown, the time-spec 4120 includes information about a start time 4080, a duration 4090, and an end time 4140. In some embodiments, a start time 4080 may be omitted from a time-spec. In some such embodiments, a start time may be implied based on a time at which a particular taint or attribute was applied. In some embodiments, either or both of duration 4090 and end time 4140 may be omitted from a time-spec 4120. In embodiments including only one of duration 4090 or end time 4140, a taint or attribute associated with such a time spec may nonetheless have a specified expiration or ending time determined by either the duration 4090 or the end time 4140.

In some embodiments, a start time 4080 associated with a time-spec 4120 may be set or configured to have a taint become active at some future time. In some embodiments, a start time 4080 may be populated with a value based on when the taint was created or when the taint is applied. In some embodiments, a start time 4080 may be omitted and a start time of the taint may be understood or otherwise treated by a scheduler as one or more of a time at which the taint was created, a time at which the taint was applied, or a time at which a resource associated with that taint is offered.

Some embodiments of a time-spec may include various kinds of recurrence specifications, such as a combination of a first start time 4080, a duration 4090, and a recurrence 4100. For example, a time-spec including a recurrence 4100 may indicate that a subject of the time spec (e.g. an attribute or a taint) should initiate at a given (or implied) start time 4080 and take effect every third Tuesday at 13:00 GMT.

In some embodiments, periodically applied or periodically effective taints may be represented as a series of multiple individual taints or as taints having a specified recurrence. In some embodiments, all taints managed by a scheduler may be presumptively permanent until removed.

Although depicted and discussed in the context of a taint, embodiments of the structure and data fields depicted in FIGS. 2a and 2b may also describe embodiments of an attribute applied to or associated with a resource. Whereas taints may be described in terms of start or exclusion effect types, attributes may be described in terms of a label effect type. A label effect type may indicate that some or all of the other information included in the attribute is meant to be applied to a resource for purposes of reference or identification.

In some embodiments, attributes and taints may be differentiated based on their respective effect type. In some such embodiments, a taint 4040 may not be otherwise separately identified as such. For example, although described herein in terms of taints and attributes, it may be possible to describe the above-noted embodiments in terms of exclusion-, start-, and label-type attributes.

Figure 2C:
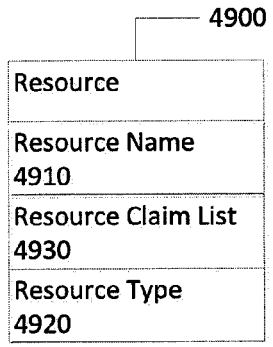
FIG. 2c shows a block diagram representing an embodiment of a data structure associated with a resource as described herein.

An embodiment of a representation of a resource is depicted in FIG. 2c. In the embodiment shown, a resource 4900 may include information indicating or representing a resource name 4910 that identifies the resource within one or more computing environments. In some embodiments, such a name 4910 may include, be, or represent a unique identifier within the computing resource environment. In some embodiments, a resource 4900 may include information indicating or representing a resource type 4920 associated with the resource 4900. Resource type 4920 may, in some embodiments, allow for classification and segregation of resources into, for example, memory resource types, processor resource types, virtual machine resource types, virtual disk resource types, and so on. In some embodiments, a resource type or other information indicating the nature of the resource may be included or embedded in the resource name 4910 information. In some embodiments, the resource 4900 may also identify related resources (not shown), such as memory and processor resources associated with a particular physical machine resource.

In some embodiments, a resource 4900 may also include information indicating or identifying a particular resource request or resource claim that is currently utilizing the resource 4900. In some embodiments, a resource 4900 may include a resource claim list 4930. The resource claim list may 4930 may include one or more identifiers of, references to, or information representing resource claims (not shown). A resource claim identifier may identify a particular resource claim that is meant to reserve the resource for use by a particular task for a particular time period. In some embodiments, a resource 4900 may instead, or in addition, include a data field indicating whether the resource is subject to an active claim or otherwise currently being utilized (not shown). In some embodiments, a blank or null value in the resource claim list 4930 may indicate that the resource 4900 is available for allocation to a resource request. In some embodiments, a scheduler may evaluate a potential claim against the resource claim list 4930 to determine whether the resource 4900 is available to be claimed during a particular time period despite any current or future claims already included in the resource claim list 4930.

In some embodiments, multiple resource offers may be combined or pooled. In some such embodiments, individual claims may be made against the pooled or combined resources rather than, or in addition to, claims made against individual resources. In some embodiments, individual claims may be made against offers of resources. A resource offer may include an individual resource or may include combined or pooled resources.

Figure 2D:
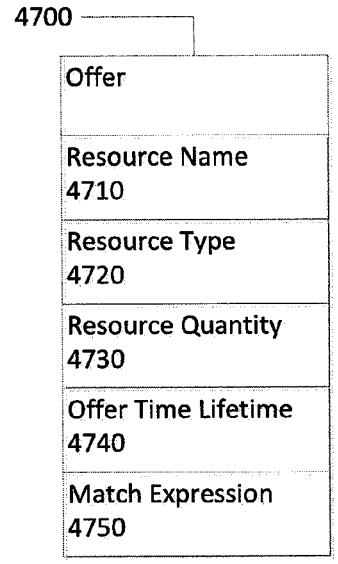
FIG. 2d shows a block diagram representing an embodiment of a data structure associated with an offer as described herein.

An embodiment of a representation of an offer is depicted in FIG. 2*d*. In the embodiment shown, an offer 4700 may include a tuple representing a resource name 4710 or names or a name or identifier associated with pooled or combined resources, a resource quantity 4730 representing an amount of the resource or resources being offered, and various other identifying or distinguishing information about the offered resource(s) such as a resource type 4720, an offer lifetime 4740, and zero or more attributes and/or taints.

In some embodiments, an offer lifetime 4740 may be represented by a time-spec such as the one described above with respect to taints. In some embodiments, a resource type 4720 may represent one of a number of predefined or dynamically-definable resource types including, but not limited to, the types of resources previously described herein.

An attribute or taint may include or be associated with an ID identifying the particular attribute with respect to the resource. Some embodiments may allow for multiple attributes within a resource to have the same name. In such embodiments, an attribute ID may be required to differentiate between particular attributes of a resource. In some embodiments, some or all of such identifying or distinguishing information may be directly included in an offer 4700.

In some embodiments, information identifying or representing an arbitrary number of taints and attributes may be included in a match expression 4750 included in or associated with an offer 4700. In some embodiments, an offer 4700 may include a resource name 4710, a resource quantity 4730, and one or more match expressions 4750 representing information about any attributes or taints associated with the offered resource(s). In embodiments where a resource name 4710 does not include or otherwise inherently identify a resource type, an offer may also include a resource type 4720. In embodiments where an offer is available until claimed, an offer lifetime 4740 may be omitted or otherwise left blank or null.

Figure 2E:
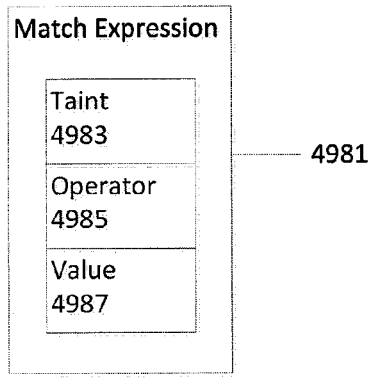
FIG. 2e shows a block diagram representing an embodiment of a data structure associated with match expression as described herein.

An embodiment of a match expression is shown in FIG. 2*e*. In some embodiments, a match expression may be an independent or standalone data structure that may be defined separately from and/or independently of an offer or a resource request. In some embodiments, a match expression may be represented by a group of fields or information embedded in other data structures, parameters, or property lists. In some embodiments, the match expression 4981 may be included in other data structures, parameters, or property lists, such data representing or defining an offer or a resource request, either directly or by reference. For example, each match expression may have an identifier associated therewith. In some embodiments, attributes or resources or tolerations may include or refer to a match expression allowing evaluation of and/or by a counterpart data structure (e.g. resource-request; attribute-constraint; toleration-taint).

In some embodiments, information about any attribute or taint tied to an offer 4700 of resource(s) may be included in the data representing the match expression 4981. In some embodiments, a scheduler may evaluate the match expression 4981 of an offer to determine whether the offered resource(s) can be claimed by a particular request.

In the embodiment shown in FIG. 2*e*, the match expression 4981 includes a tuple representing a name of a taint 4983, a value 4987 associated with that taint 4987 and an operator 4985 used to evaluate the value 4987. The operator 4985 may specify an operation that identifies a comparison test to be performed for resolution of the match expression. Embodiments of comparison tests may include one or more of = (equals), ~ (regular expression match), < (less than), > (greater than), and ! (not) used either alone or in combination. Some embodiments may include operations such as "present," which test for the presence or absence of a parameter or value.

In some embodiments, a match expression 4981 may specify one or more comparison target values for a comparison test operation. In some embodiments, such a comparison target may be used to evaluate each of a set of taints or attributes having the same name.

In some embodiments, a match expression 4981 may specify some or all of an expected or desired time-spec. In some embodiments, a match expression 4981 may specify an effect type that may be associated with a particular matched taint or attribute. In some embodiments, a match expression 4981 may specify a regular expression that includes multiple distinguishing features or aspects of a taint or attribute.

As noted above, a taint or attribute may include a name and a value. For example, an attribute may indicate that a memory resource is a hard drive of a particular type. An embodiment of an attribute value may indicate a serial number of the hard drive or a storage capacity associated with that hard drive. In some embodiments, an attribute may have multiple values. In some embodiments, an attribute may not include a value. For example, an attribute named "Chicago" may indicate that the resource bearing this attribute is located in Chicago. An attribute value in such a case may be omitted. Alternatively, the attribute may have the name "location" and the attribute value could be "Chicago." In yet another embodiment, the attribute may have the name "locations" and could include multiple values such as "Chicago," "Peoria," and "Bloomington." Similarly, a taint may include a value associated with or indicating an extent or nature of the taint. For example, a taint named "slowNetworkCard" or "slow" may be applied to a network card resource and the taint may include a value indicating, for example, a degree or level of slowdown in the card. In some embodiments, a taint may not include a value. For example, a taint named "PrivateUseOnly" may be meant to make a resource inaccessible to anyone unaware of the taint. Such a taint may be effective without requiring a taint value.

As discussed previously, a constraint may be a mechanism for limiting a claim to a set of compatible resources. One or more constraints may be attached to a claim. In some embodiments, constraints may provide matching rules for attributes so that a claim may be bound only to resources that have attributes that are compatible with all of the constraints on the claim or resource request. In some embodiments, a match expression of the type depicted in FIG. 2e may be used or otherwise applied to represent some or all of a constraint specification.

In some embodiments, a constraint may include an effect type which describes the action to take. In some embodiments, a constraint may be associated with a "constrain" effect type. Such an effect type may require that a resource have a compatible set of attributes in order to be utilized by a claim or resource request.

In some embodiments, a toleration may include an effect type that is the same as an effect type of the taint the toleration is meant to address. Having matching effect types in the taint and the toleration permits claims with the toleration to be bound to resources tainted with a taint of that effect type. For example, a claim having an exclusion toleration will not be made infeasible (suppressed) by an exclusion taint.

In some embodiments, the effect type may also be included as part of the match expression 4981. In such embodiments, match expressions may be used to realize effect-based or effect-driven matching. Embodiments of match expressions that include an effect may allow, for example, identifying and directly matching exclusion taints to exclusion tolerations.

In some embodiments, a match expression may be empty or missing. Such embodiments may relate to embodiments where a resource has no taints and/or attributes or where a resource request has no tolerations and/or constraints.

Tolerations may be used in conjunction with constraints in situations where it is desired to make a request use only a tainted resource. For example, a machine may be tainted with an exclusion taint to indicate that it is dedicated to a particular user or user group. Because a taint is an attribute, a resource request having a constraint that requires the exclusion taint would force a job associated with such a resource request to run only on the tainted machine. However, that job would also require a toleration of the exclusion taint in order to make use of the tainted machine.

Figure 2F:
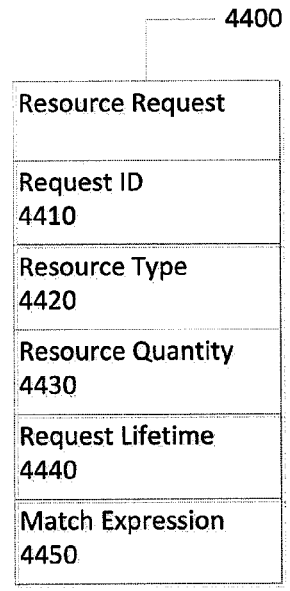
FIG. 2f shows a block diagram representing an embodiment of a data structure associated with a resource request as described herein.

An embodiment of a resource request that may include constraints or tolerations is depicted in FIG. 2f. In the embodiment shown, a resource request 4400 may include a way of specifying the kind and quantity and quality of the resources desired. In some embodiments, a request ID 4410 may enable a scheduler to identify and manage the resource request. The resource request 4400 may also include a set of one or more resource types 4420 and quantities 4430 and qualities. For example, a request for flash memory may specify that it is for 16 gigabytes of flash memory.

The resource request 4420 may also include information representing a request lifetime 4440. An embodiment of request lifetime 4440 may include a definition of one or more time-periods according to a time-spec similar to the one depicted in FIG. 2b. In some embodiments, a request lifetime 4440 may be counted from fulfillment of a resource claim or allocation. In some embodiments, a request lifetime 4440 may be counted from the time the resource request is made or is acknowledged by the scheduler.

In some embodiments, desired resource attributes or taints may be referred to or otherwise indicated by a match expression 4450 associated with or included as part of the resource request 4400.

Figure 1B:
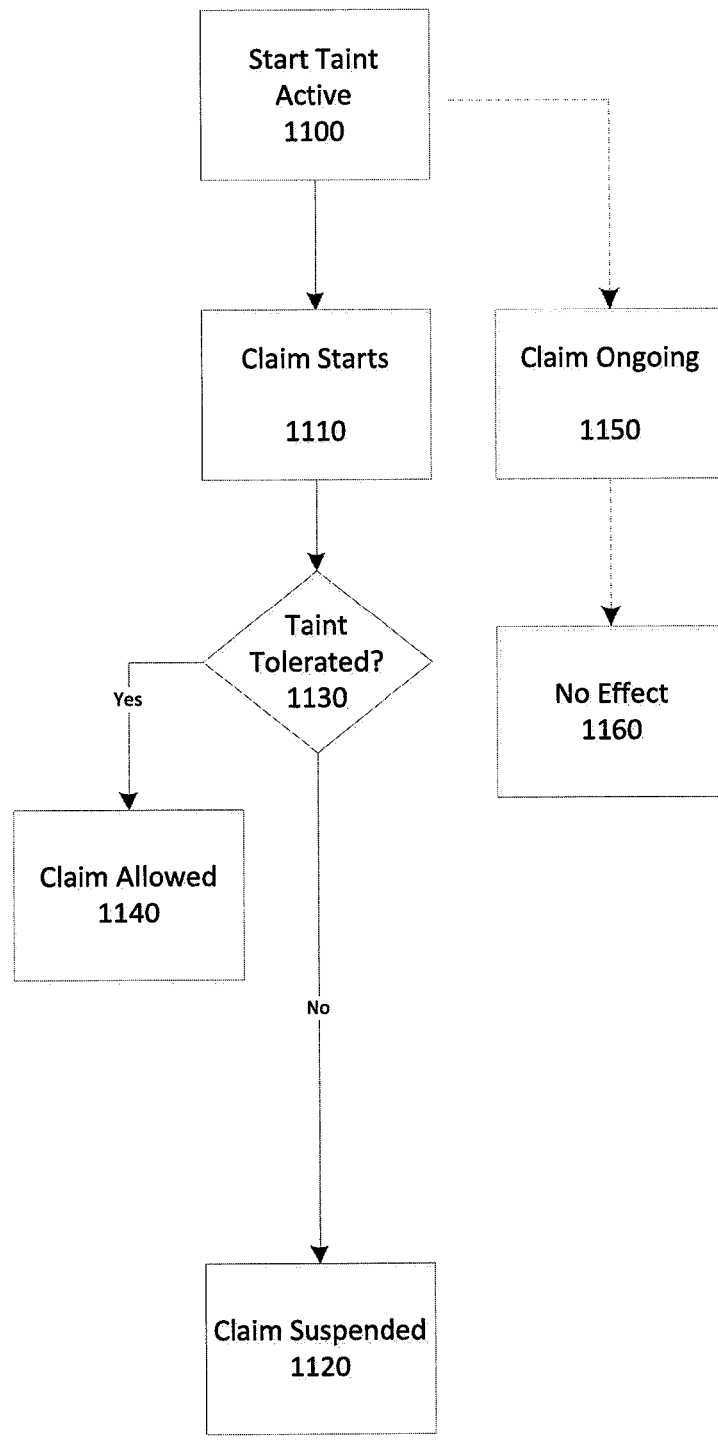
FIG. 1b shows a block diagram representing an embodiment of a workflow associated with start taints as described herein.

As discussed above, taints may have different effect types. Two embodiments of taints discussed above include start taints, which have a start effect type, and exclusion taints, which have an exclusion effect type. An embodiment depicting use of a start taint is shown in FIG. 1b. A start taint includes an active period defined by a time-spec as described herein. Any claim having a start time that overlaps with the active period of the start taint on a resource is suspended unless the resource request associated with the claim tolerates the taint.

In the embodiment shown, a start taint is applied to a resource becomes active 1100 or otherwise begins at a certain start time. An attempt to start a claim 1110 while the taint is active 1100 may be analyzed to determine whether the applied taint is tolerated 1130 by the claim. Examples of such claims may include an incoming resource request or a previously-made claim with a future start time. In response to a determination that the taint is tolerable 1130, the claim may be allowed to start 1140. Otherwise the claim may be suspended or otherwise denied 1120.

In some embodiments of a start taint as shown in FIG. 1b, a resource may be associated with an ongoing claim 1150, such as a task that began utilizing the resource for execution prior to the start time of the taint. In some embodiments, the application of a start taint 1100 to a resource subject to an ongoing claim 1150 having a start time that predates the start time of the taint may have no effect 1160 on that claim 1150. In other words, the claim 1150 will be allowed to remain on the resource for the duration and/or end time associated with that claim (or, in some embodiments, until that claim is suspended or evicted for other reasons, such as pre-emption).

Figure 1C:
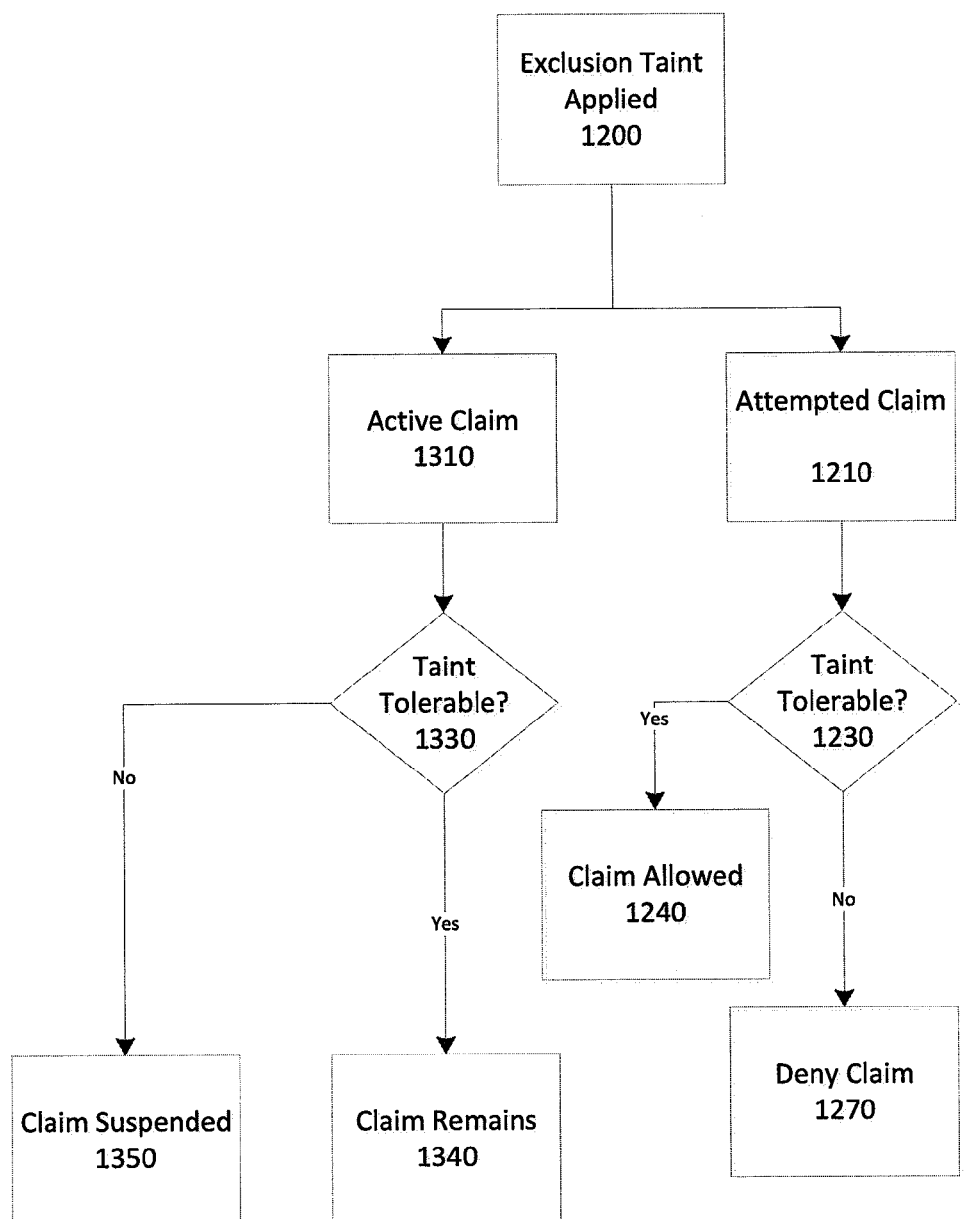
FIG. 1c shows a block diagram representing an embodiment of a workflow associated with exclusion taints as described herein.

As described above, embodiments of taints having an exclusion effect type may suspend any claims against the tainted resource unless they have the appropriate tolerance. An embodiment of an exclusion taint is shown in FIG. 1c. In the embodiment shown, after an exclusion taint is applied to a resource 1200, an attempt to claim 1210 the resource, such as an incoming resource request or previously-made claim for future use, may be analyzed to determine whether the applied taint is tolerable 1230 to the claim or request. In response to a determination that the taint is tolerable, the claim may be allowed to proceed 1240. Otherwise the claim attempt for the tainted resource may be denied 1270.

The exclusion taint also causes existing resource requests or claims 1310 that draw from the tainted resource to be evaluated. On an exclusion tainted resource, any existing claim, including an active claim 1310 where the resource is being utilized, may be analyzed to determine if that claim tolerates 1330 the applied exclusion taint 1200. If the active claim 1310 tolerates 1330 the exclusion taint, the claim may be permitted to continue drawing from the resource 1340 while the resource is so tainted. If the active claim 1310 does not tolerate 1330 the exclusion taint, the claim may be suspended 1350 (or, in some embodiments, evicted) from the resource until an alternate resource is found to fulfill the claim or until the taint is removed from the resource or the claim is withdrawn, cancelled, or expires.

In some embodiments, an embodiment of a taint, such as the one depicted in FIG. 2a, that is applied to a top-level resource may be propagated to a group of resources. Embodiments of resource groups may include, for example, all the devices, all the memory, and/or every resource associated with a particular machine. In some embodiments, a group of resources may be referred to as a resource pool. In some embodiments, a taint 4040 may have a propagation flag or parameter 4110 that specifies whether the taint 4040 is to be propagated through a resource pool. In some embodiments, such a propagation parameter 4110 may be omitted and all taints may be configured to propagate down to any resource pool associated with a tainted top-level resource. For example, a physical machine that is tainted because it has been used to process PII, or due to a current or planned operating system upgrade, may cause the underlying physical memory and processor(s) to receive the taint as well. Any subsequent claim or resource request for some or all of the underlying memory associated with the tainted physical machine must therefore include an appropriate toleration to the taint even though the underlying memory did not have a taint directly applied thereto.

Figure 3A:
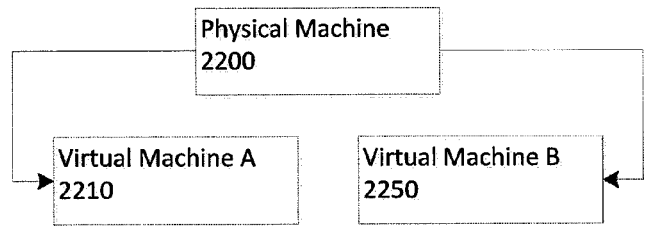
FIG. 3a shows a block diagram representing an embodiment of taint propagation as described herein.

An example of an embodiment of taint propagation is shown in FIG. 3a. In the embodiment shown, a virtual machine 2210 may be created from resources located in a physical machine 2200. A second virtual machine 2250 may also be created from resources located in the physical machine 2200.

In some embodiments, the physical machine 2200 may be tainted in order to reserve that machine 2200 for a dedicated user or user group. In some such embodiments, the taint applied to the physical machine 2200 may propagate down to all the resources of the physical machine 2200. As a result, the first and second virtual machines 2210 2250 may then also become tainted or otherwise include tainted resources because of the taint applied to the physical machine 2200.

In some embodiments, the first virtual machine 2210 may be tainted in order to reserve that machine 2210 for a dedicated user or user group. In some such embodiments, the taint applied to the virtual machine 2210 may not propagate back to the physical machine 2200. In such embodiments, the second virtual machine 2250 may not be tainted despite sharing physical resources with the tainted virtual machine 2210.

In some embodiments, the first virtual machine 2210 may be tainted in order to designate that machine 2210 for processing of PII or SOX tasks. In some such embodiments, the taint on the virtual machine 2210 may propagate up to one or more physical resources of the underlying physical machine 2200. In such embodiments, the tainted physical resource(s) of the physical machine 2200 may cause the second virtual machine 2250 to also become tainted by virtue of sharing those tainted physical resource(s) with the first virtual machine 2210.

Figure 3B:
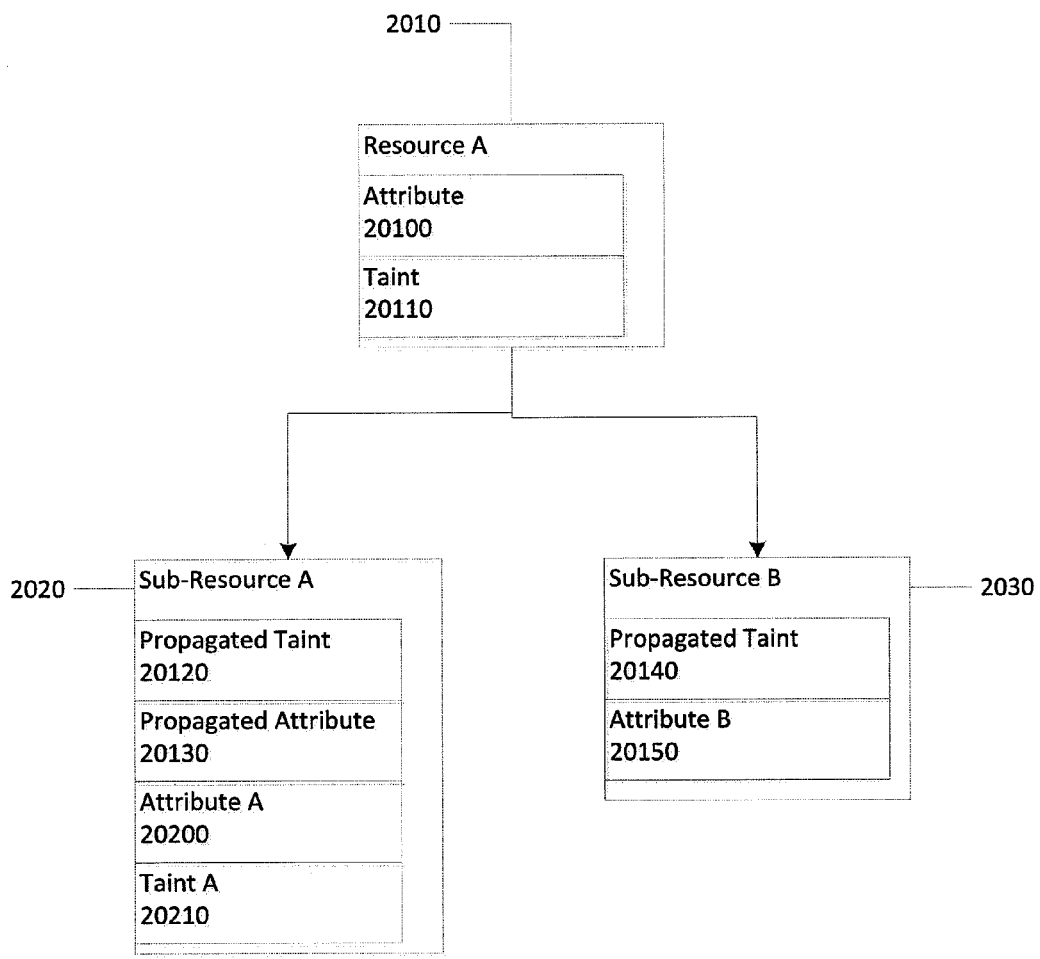
FIG. 3b shows a block diagram representing an embodiment of taint propagation as described herein.

Another embodiment of resource taint propagation is shown in FIG. 3b. In the embodiment shown, a top-level resource 2010 may include one or more attributes 20100 and one or more taints 20110. In some embodiments, such a top-level resource 2010 may represent a virtual machine, a physical machine, a database, a storage array, a processor array, a cluster of machines, a data center, one or more servers, or combinations thereof. In some embodiments, the top-level resource 2010 may include one or more sub-resources 2020 2030. In an embodiment where a top-level resource represents, for example, a cluster of machines, each sub-resource may represent a physical or virtual machine included in that cluster. In an embodiment where a top-level resource represents, for example, a virtual machine or a physical machine, each sub-resource may represent a component of that machine.

In the embodiment shown, a first sub-resource 2020 may include the taint propagated to it 20120 from the top-level resource 2010 as well as an attribute propagated therefrom 20130. In an embodiment where the top-level 2010 resource is a physical machine the first sub-resource 2020 may be a physical memory associated with that machine. The sub-resource 2020 may also include its own attribute(s) 20200 and, in some embodiments, its own taint(s) 20210. For example, the top-level resource 2010 may be a physical machine tainted to dedicate the resource to a particular user or user group or to mark the resource for an operating system update. In such an embodiment, the sub-resource 2020 may represent a hard drive known to be suffering performance degradation. The sub-resource may 2020 may therefore receive a propagated taint 20120 from the top-level resource 2010 indicating an operating system upgrade and may also have a taint 20210 applicable only to the sub-resource 2020 indicating a performance degradation. A resource request or claim attempting to make use of that sub-resource 2020, either directly or indirectly, must therefore be tolerant of the top-level resource taint 20110 and also the taint 20210 on the sub-resource 2020.

In some embodiments, the top-level resource 2010 may include a second or different sub-resource 2030. In an embodiment where the top-level resource 2010 represents a resource pool, the second sub-resource 2030 may represent a device, such as a processor or a hard drive, that makes up part of the resource pool 2010. In some embodiments, the second sub-resource 2030 may also include a propagated taint 21040 from the top-level resource 2010. The second sub-resource 2030 may, in some embodiments, have one or more of its own attribute(s) 20150 or taint(s) (not shown).

In some embodiments, taints and tolerations may be used to handle circumstances that claims and resource requests otherwise cannot. Taints and tolerations may be used to impose a policy onto other claims (e.g., for security isolation); and they can capture infrequent cases where continued operation is desirable in the face of some surprising circumstance. In some embodiments, the application and removal of taints or attributes may cause a sequence or cascade of effects (such as suspending other claims) which may need to be subsequently addressed by a scheduler.

Figure 4:
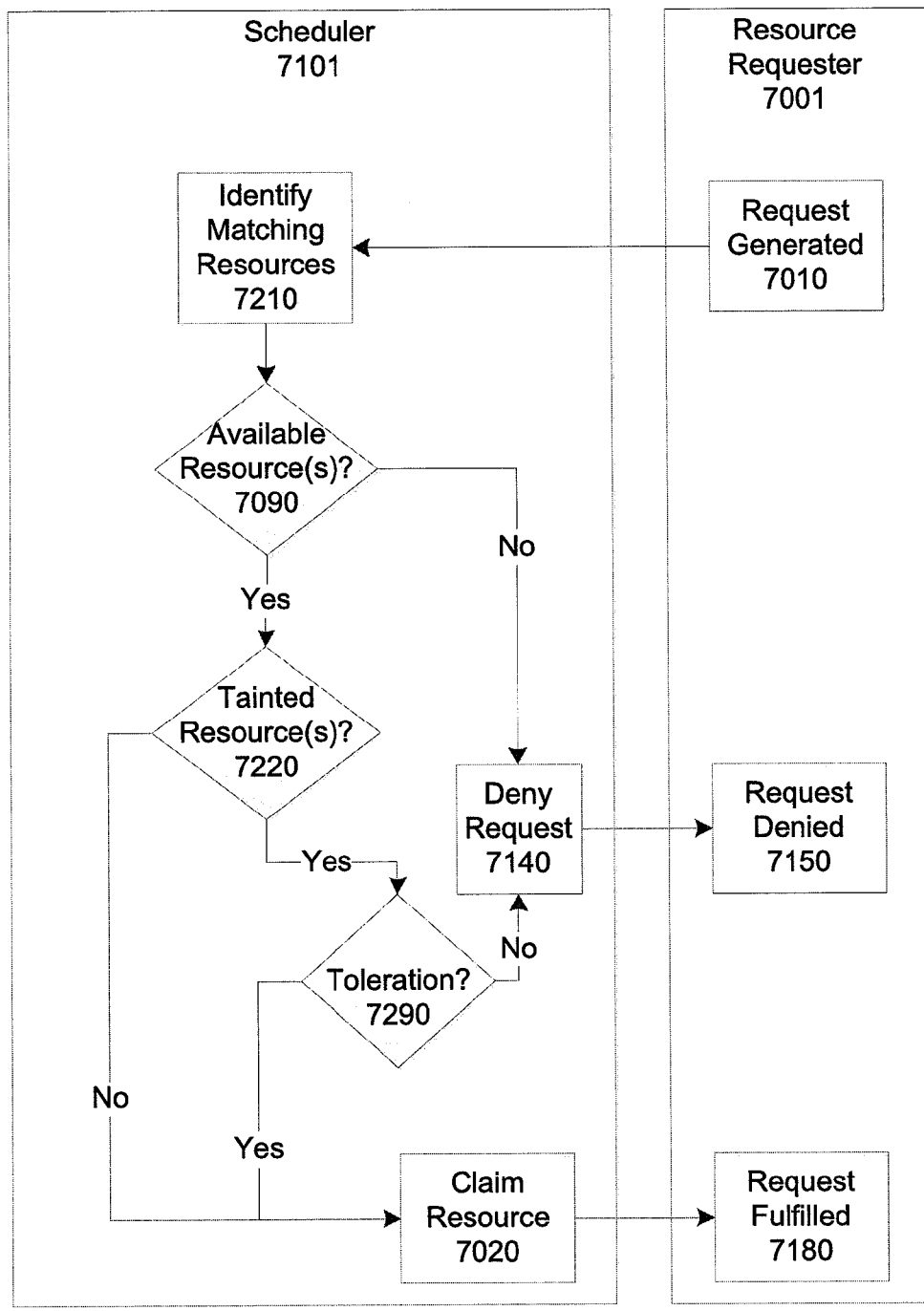
FIG. 4 shows a block diagram representing an embodiment of a workflow associated with resource scheduling as described herein.

An embodiment of a resource scheduling and allocation process with potentially tainted resources is depicted in FIG. 4. In the embodiment shown, a resource requester 7001 may generate a resource request 7010 which is sent to a resource scheduler 7101. In some embodiments, a resource requester may include user activity, system operation managers, machine management, or various automated tools or processes.

The generated request may be received by a resource scheduler 7101 in a computing environment such as a data center or a cloud computing platform. The scheduler may be embodied in one or more physical or virtual machines. In some embodiments, a scheduler 7101 may be an application or set of applications running on or operably interfacing with one or more physical or virtual machines or databases.

The scheduler may, based on the resource request, attempt to identify resources that match 7210 requested resource or resource type. In some embodiments, a resource request may be for a specific resource, such as a particular network card having a specific MAC address. In some embodiments, a request for a specific resource may be realized through a constraint, such as requesting a network card and constraining the request to a particular MAC address attribute. In some embodiments, a resource request may be for a particular resource type, such as memory or processor resources. In some embodiments, a resource request may include constraints which the scheduler may evaluate as part of the resource identification 7210 process. In some embodiments, all resource requests sent to a scheduler may be generic requests with a resource type or a particular resource name or other resource property being specific in the constraints associated with the request.

From among those matching resources, it may be determined 7090 whether any of those resources are available to fulfill the generated request 7010. In some embodiments, such availability may be a preliminary check to determine whether the resource is currently allocated a claim or otherwise being utilized. If there are no available resources 7090, the resource request may be denied 7140 and a request denial indication 7150 sent to the resource requester 7001.

In some embodiments, if there are available resources 7090, those resources may be evaluated to determine if there are any un-tainted resources 7220 from among the available resources. If there are un-tainted resources 7220, one or more of those resources may be claimed 7020 in order to fulfill the request 7180 for the resource requester 7001, which may then begin utilizing that resource. If the resource(s) are tainted 7220, the scheduler 7101 may determine whether the resource request includes a toleration 7290 to the taint(s) on the resource(s). If the resource request does not include a toleration to the taint(s) on at least one of the resource(s), the resource request may be denied 7140. If the resource request does tolerate the taint(s) on a particular resource (or resources), that resource(s) may be claimed 7020 by the scheduler 7101 for allocation.

Figure 5:
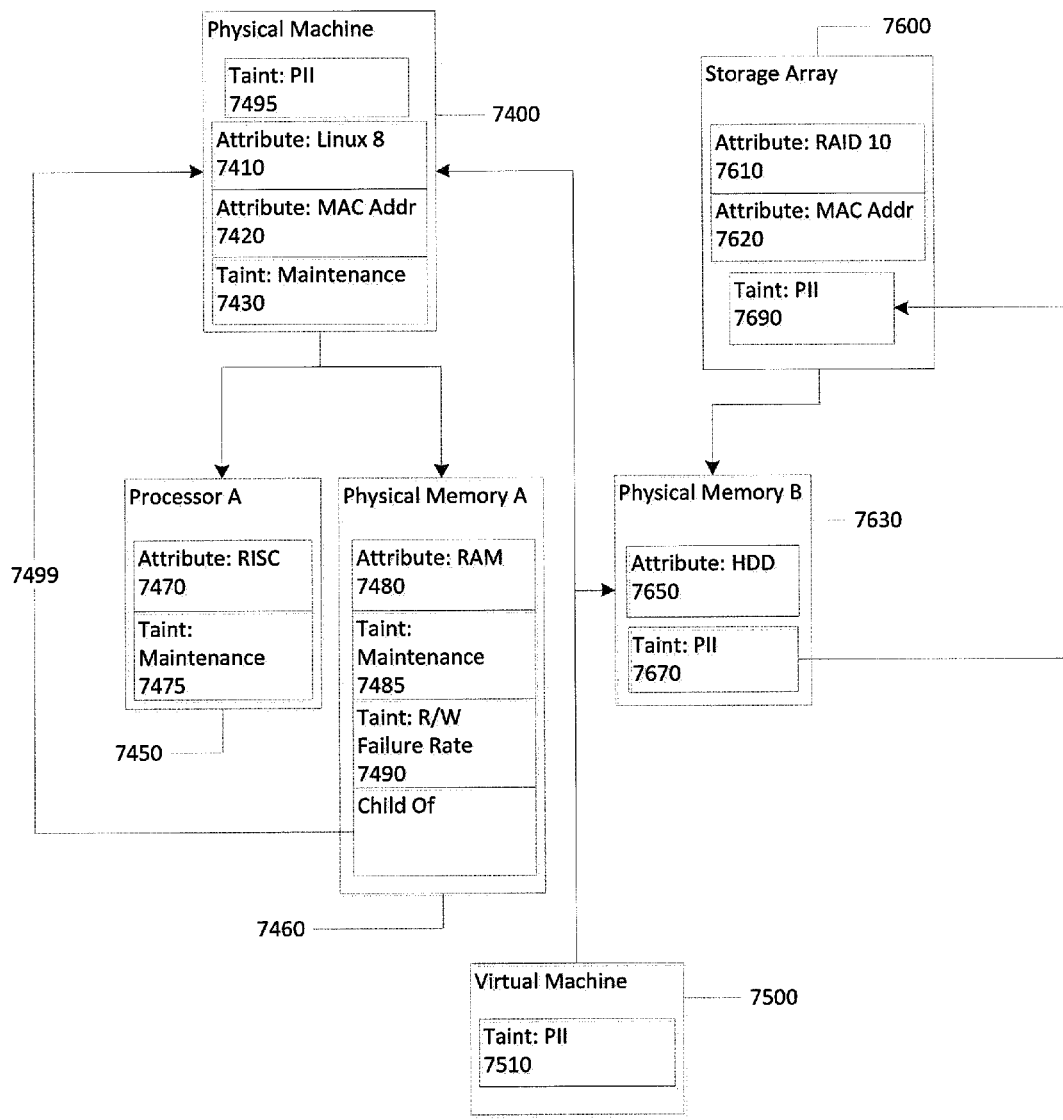
FIG. 5 shows a block diagram representing an embodiment of a computing resource environment as described herein.

FIG. 5 shows a block diagram of an embodiment of tainted resources. In the embodiment shown, a physical machine 7400 is depicted in a computing resource environment. The physical machine 7400 may include an attribute 7410 indicating that it is using a particular operating system and another attribute 7420 indicating that it is associated with a particular network address. This physical machine 7400 may also include a taint 7430 indicating that maintenance is either required or being performed thereon.

In the embodiment shown, the physical machine 7400 may include physical memory 7460 and processor 7450 sub-resources. The physical memory 7460 may also include an attribute 7480 such as one indicating a type of physical memory (in this case, RAM). The physical memory 7480 will inherit the maintenance taint 7485 from the physical machine 7400 resource. In some embodiments, this may be realized by associating a copy of the maintenance taint 7430 with the memory resource 7460. In some embodiments, such taint propagation or inheritance may be realized by defining the memory 7460 as a child resource 7499 linked to the parent resource of the physical machine 7400.

The physical memory may also have a separate taint 7490 indicating a particular problem with reliability or access, such as a read or write failure rate. Such a taint may be a taint without an explicit or otherwise expressly specified end time, and instead may be a permanent taint on the resource that will not be removed until the resource is removed or replaced.

In the embodiment shown, the processor sub-resource 7450 may also include an attribute 7470 indicating a particular type or speed of processor or a particular processor architecture. The processor 7470 will also inherit the maintenance taint 7430 (stored locally as taint 7475) from the physical machine 7400.

In the embodiment shown, storage array 7600 may also be a resource in the computing resource environment. The storage array may also include attributes 7610 7620 indicating storage type and network address. The storage array 7600 may also include one or more physical memory 7630 sub-resource(s), each of which may also have a respective attribute 7650 indicating properties or characteristics thereof. In the embodiment shown, the physical memory 7630 includes an attribute 7650 indicating that it is a disk drive.

In the embodiment shown, a virtual machine resource 7500 may be instantiated in the computing resource environment using the physical machine 7400 and a physical memory 7630 from the storage array 7600 as a remote storage location. The virtual machine 7500 may be tainted 7510 to indicated the presence or processing of PII on the virtual machine 7500. This PII taint 7495 may be propagated to the physical machine 7400. The PII taint 7670 may also be propagated to the physical memory 7630 from the storage array.

In some embodiments, a taint 7670 propagated in this manner to the physical memory 7630 resource of the storage array 7600 may also be propagated or otherwise indicated in the storage array 7600, such as by including a taint 7690 whose identifier or value is the identifier of the sub-resource taint 7670. This would indicated to a resource request attempting to claim some or all of the storage array 7600 that at least part of the array is tainted.

Figure 6:
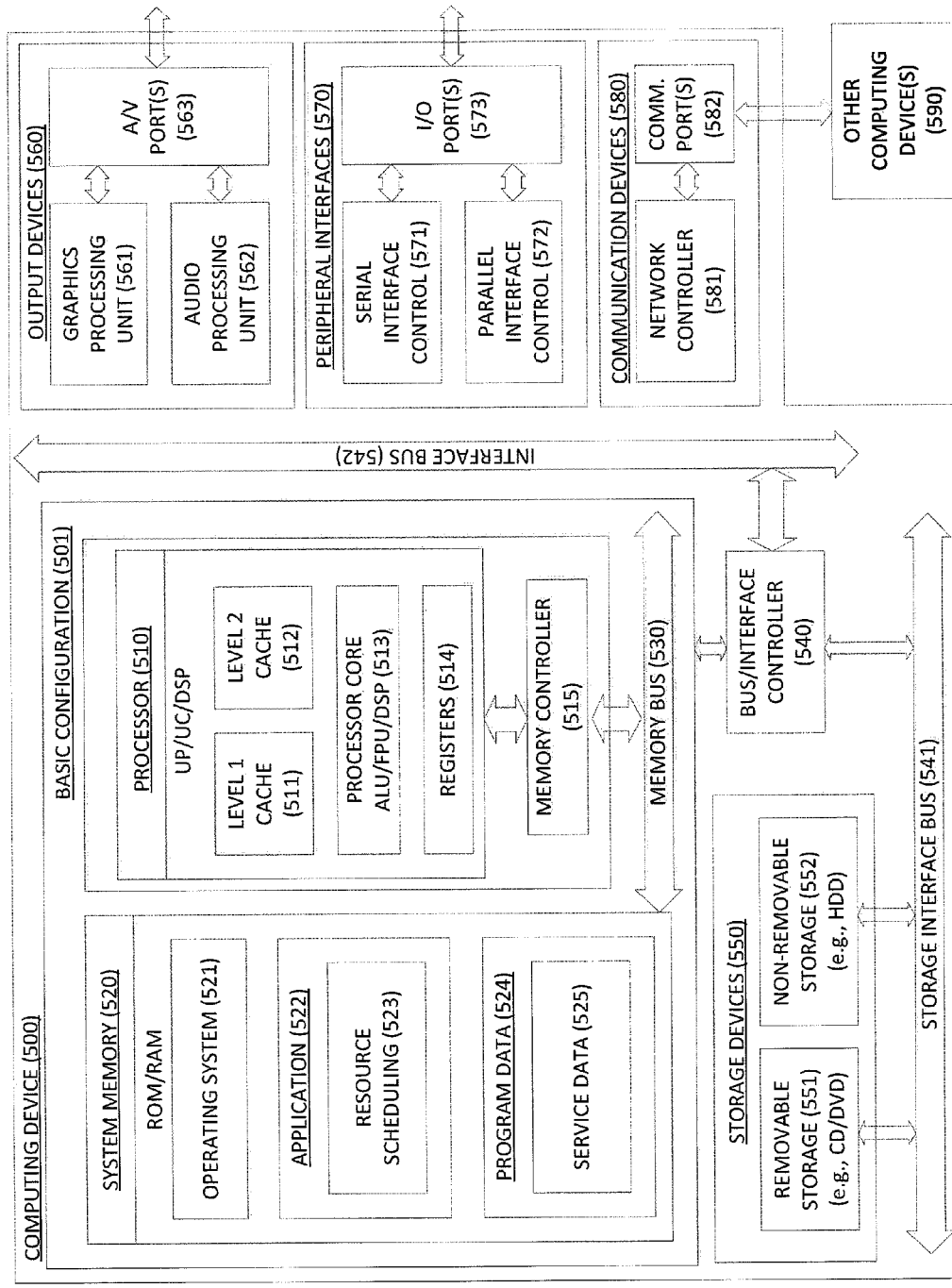
FIG. 6 shows an embodiment of a computing system configured to operate part or all of an embodiment of a computing resource environment as described herein.

FIG. 6 is a block diagram illustrating an example computing device 500 that is arranged to perform resource management techniques as described herein. In a very basic configuration 501, computing device 500 typically includes one or more processors 510 and system memory 520. A memory bus 530 can be used for communicating between the processor 510 and the system memory 520.

Depending on the desired configuration, processor 510 can be of any type including but not limited to a microprocessor (µP), a microcontroller (µC), a digital signal processor (DSP), or any combination thereof. Processor 510 can include one more levels of caching, such as a level one cache 511 and a level two cache 512, a processor core 513, and registers 514. The processor core 513 can include an arithmetic logic unit (ALU), a floating point unit (FPU), a digital signal processing core (DSP Core), or any combination thereof. A memory controller 515 can also be used with the processor 510, or in some implementations the memory controller 515 can be an internal part of the processor 510.

Depending on the desired configuration, the system memory 520 can be of any type including but not limited to volatile memory (such as RAM), non-volatile memory (such as ROM, flash memory, etc.) or any combination thereof. System memory 520 typically includes an operating system 521, one or more applications 522, and program data 524. Application 522 may include a resource, taint, request, and/or toleration management or scheduling feature 523 as discussed herein. Program Data 524 includes location data such as one or more name schemas or object name lists 525 that are useful for performing the desired operations as described above. In some embodiments, application 522 can be arranged to operate with program data 524 on an operating system 521 such that the overall system performs one or more specific variations of techniques as discussed herein. This described basic configuration is illustrated in FIG. 4 by those components within line 501.

Computing device 500 can have additional features or functionality, and additional interfaces to facilitate communications between the basic configuration 501 and any required devices and interfaces. For example, a bus/interface controller 540 can be used to facilitate communications between the basic configuration 501 and one or more data storage devices 550 via a storage interface bus 541. The data storage devices 550 can be removable storage devices 551, non-removable storage devices 552, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 520, removable storage 551 and non-removable storage 552 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media can be part of device 500.

Computing device 500 can also include an interface bus 542 for facilitating communication from various interface devices (e.g., output interfaces, peripheral interfaces, and communication interfaces) to the basic configuration 501 via the bus/interface controller 540. Example output devices 560 include a graphics processing unit 561 and an audio processing unit 562, which can be configured to communicate to various external devices such as a display or speakers via one or more A/V ports 563. Example peripheral interfaces 570 include a serial interface controller 571 or a parallel interface controller 572, which can be configured to communicate with external devices such as input devices (e.g., keyboard, mouse, pen, voice input device, camera, touch input device, etc.) or other peripheral devices (e.g., printer, scanner, etc.) via one or more I/O ports 573. An example communication device 580 includes a network controller 581, which can be arranged to facilitate communications with one or more other computing devices 590 over a network communication via one or more communication ports 582.

The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 500 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 can also be implemented as a personal computer including both laptop computer and non-laptop computer configurations.

In some cases, little distinction remains between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Only exemplary embodiments of the systems and solutions discussed herein are shown and described in the present disclosure. It is to be understood that the systems and solutions discussed herein are capable of use in various other combinations and environments and are capable of changes or modifications within the scope of the concepts as expressed herein. Some variations may be embodied in combinations of hardware, firmware, and/or software. Some variations may be embodied at least in part on computer-readable storage media such as memory chips, hard drives, flash memory, optical storage media, or as fully or partially compiled programs suitable for transmission to/download by/installation on various hardware devices and/or combinations/collections of hardware devices. Such variations are not to be regarded as departure from the spirit and scope of the systems and solutions discussed herein, and all such modifications as would be obvious to one skilled in the art are intended to be included within the scope of the following claims:

The invention claimed is:

1. In a computing resource environment including at least one resource capable of being allocated to at least one of a plurality of tasks, a method comprising:
   receiving, at a resource scheduler operably connected to the computing resource environment, a request to allocate the resource to perform a particular task;
   determining, in response to the received request, whether the resource is subject to a taint included in a resource offer;
   in response to a determination that the resource is subject to a taint, analyzing the resource request to determine whether the resource request includes a toleration for the taint based on the outcome of comparing the taint and a toleration match expression included in the toleration;
   in response to a determination that the resource request includes a toleration for the taint, allocating, with the resource scheduler, the resource to the particular task; and
   in response to a determination that the resource request does not include a toleration for the taint, not allocating the resource to the request due to the taint.

2. The method of claim 1, the taint including a first name, the toleration including a second name; and
   said analyzing including comparing the second name and the first name; and
   determining that the resource request includes a toleration for the taint based on an outcome of said comparing.

3. The method of claim 1, the taint including a taint value, the toleration including a toleration value and a toleration operator; and
   said analyzing including
   comparing the toleration value and the taint value using the toleration operator; and
   determining that the resource request includes a toleration for the taint based on an outcome of said comparing.

4. The method of claim 3, the resource representing a hardware component,
   the taint value representing a level of performance degradation in the hardware component, and
   the toleration value representing a maximum level of tolerated performance degradation such that the resource request includes a toleration for the taint in response to a determination that the level of performance degradation in the hardware component indicated by the taint value is less than the maximum level of tolerated performance degradation indicated by the toleration value.

5. The method of claim 3, the toleration operator including one or more of the logical operators: equals, regexp, greater than, less than, and not.

6. The method of claim 1, the taint including a taint effect type and the toleration including a tolerated effect type; and
   said analyzing including
   first comparing the taint effect type and the tolerated effect type; and
   determining that the resource request includes a toleration for the taint based on an outcome of said first comparing.

7. The method of claim 6, the taint effect type including one of a start effect type and an exclusion effect type.

8. The method of claim 1, the resource offer representing an offer of one or more hardware resources,
   the taint including a taint value representing a level of performance degradation in the hardware component, and
   the toleration match expression including a toleration value representing a maximum level of tolerated performance degradation such that:
   the resource request includes a toleration for the taint in response to a determination that the level of performance degradation in the hardware component indicated by the taint value is less than or equal to the maximum level of tolerated performance degradation indicated by the toleration value.

9. The method of claim 1, the taint including a taint value, the toleration match expression including a toleration value and a toleration operator; and
   said comparing the taint and the toleration match expression including comparing the toleration value and the taint value using the toleration operator.

10. The method of claim 9, the toleration operator including one or more of the logical operators: equals, regexp, greater than, less than, and not.

11. The method of claim 1, the taint including a taint name and the toleration including a tolerated taint name; and
    said analyzing including
    comparing the tolerated taint name and the taint name; and
    determining that the resource request includes a toleration for the taint when the taint name and the tolerated taint name match.

12. The method of claim 1, the toleration match expression being represented by a tuple of a match expression name, a match expression operator, and a match expression value; and said comparing the taint and the toleration match expression including matching a taint name to the match expression name; and comparing a taint value to the match expression value using the match expression operator.

13. The method of claim 1, the request to allocate the resource including at least one constraint; and said identifying the at least one resource including determining whether the at least one resource includes one or more attributes that satisfy the at least one constraint.

14. The method of claim 13, where a taint is a resource attribute having an effect type that does not include a "label" effect.

15. The method of claim 1, the request to allocate being a request for a particular resource type.

16. The method of claim 15, the particular resource type including at least one of: a memory resource type, a database resource type, a process thread resource type, a processor resource type, a virtual machine resource type, a TCP/IP port resource type, a physical machine resource type, and an application resource type.

17. The method of claim 1, the step of allocating the resource including:

indicating the resource as being claimed by the requesting entity for performance of the particular task in response.

18. The method of claim 1, the taint including a time-spec and the request to allocate including a time-spec; and said determining whether the resource is subject to the taint including:

comparing the taint time-spec and the request time-spec; and determining that the resource is subject to the taint in response to a determination that a time period specified by the taint time-spec overlaps with a time period specified by the request time-spec.

19. The method of claim 1, the taint including a time-spec indicating a start time and an indefinite duration.

20. The method of claim 1, the offer including a time-spec indicating an effective lifetime of the offer.

21. The method of claim 20, the taint including a time-spec indicating an effective lifetime of the taint, the taint time-spec being different from the offer time-spec.

22. The method of claim 20, the request to allocate including a match expression that specifies a minimum required offer lifetime.

23. The method of claim 1, the taint including an effect type, the effect type being one of a start effect type and an exclusion effect type;

the taint including a time-spec and the request to allocate including a time-spec; and said determining whether the resource is subject to the taint including:

comparing the taint time-spec and the request time-spec;

for a taint having an exclusion effect type, determining that the resource is subject to the taint in response to a determination that a time period specified by the taint time-spec overlaps with a time period specified by the request time-spec; and for a taint having a start effect type, determining that the resource is subject to the taint in response to a determination that a time period specified by the request time-spec includes a request start time that is after a taint start time specified by the taint time-spec; and the time period specified by the taint time-spec overlaps with a time period specified by the request time-spec.

24. In a computing resource environment including at least one resource capable of being allocated to at least one of a plurality of tasks, a system comprising:

a processor; and a processor-readable medium having embodied thereon instructions which, when executed by the processor, cause the processor to perform method comprising the steps of receiving, at a resource scheduler operably connected to the computing resource environment, a request to allocate the resource to perform a particular task;

determining, in response to the received request, whether the resource is subject to a taint, the taint including a first name;

in response to a determination that the resource is subject to a taint, analyzing the resource request to determine whether the resource request includes a toleration for the taint based on the outcome of comparing a second name included in the toleration and the first name;

in response to a determination that the resource request includes a toleration for the taint, allocating, with the resource scheduler, the resource to the particular task; and in response to a determination that the resource request does not include a toleration for the taint, not allocating the resource to the request due to the taint.

25. A non-transitory computer-readable medium having embodied thereon instructions which, when executed by at least one computer in a computing resource environment including at least one resource capable of being allocated to at least one of a plurality of tasks, cause the at least one computer to perform a method comprising:

receiving, at a resource scheduler operably connected to the computing resource environment, a request to allocate the resource to perform a particular task;

determining, in response to the received request, whether the resource is subject to a taint, the taint including a taint effect type;

in response to a determination that the resource is subject to a taint, analyzing the resource request to determine whether the resource request includes a toleration for the taint based on the outcome of comparing a toleration effect type included in the toleration and the taint effect type;

in response to a determination that the resource request includes a toleration for the taint, allocating, with the resource scheduler, the resource to the particular task; and in response to a determination that the resource request does not include a toleration for the taint, not allocating the resource to the request due to the taint.

26. The medium of claim 25 wherein the taint further includes a first name, the toleration further includes a second name, said analyzing further includes comparing the second name and the first name, and determining that the resource request includes a toleration is further based on an outcome of said comparing of the second name and the first name.

27. The medium of claim 25 wherein the taint further includes a taint value, the toleration further includes a toleration value and a toleration operator, said analyzing further includes comparing the toleration value and the taint value using the toleration operator, and determining that the resource request includes a toleration is further based on an outcome of said comparing of the toleration value and the taint value using the toleration operator.

\* \* \* \* \*